United States Patent [19]
Ur

[11] 3,781,659
[45] Dec. 25, 1973

[54] CONDUCTIVITY MEASURING SYSTEM AND CONDUCTIVITY CELLS THEREFOR

[76] Inventor: Amiram Ur, 79 North End House, Fitzjames Ave., London, England

[22] Filed: Nov. 9, 1970

[21] Appl. No.: 87,810

[52] U.S. Cl. .................. 324/30 R, 23/257, 117/201
[51] Int. Cl. ............................................. G01n 27/42
[58] Field of Search .................. 324/30 R, 30 B, 62, 324/65 R, 65 M, 65 P, 71 CP, 94, 182; 23/230 B, 253 R

[56] References Cited
UNITED STATES PATENTS

| | | | |
|---|---|---|---|
| 3,037,266 | 6/1962 | Pfister | 338/273 |
| 2,161,888 | 6/1939 | Rearick | 317/242 |

*Primary Examiner*—Michael J. Lynch
*Attorney*—Popper, Bain, Bobis and Gilfillan

[57] ABSTRACT

An electrical measuring cell has two electrodes each formed by a conductive film deposited on the wall of the cell and having three portions which respectively lie inside the cell, outside the cell and around the rim of the cell. The second film portion enables the electrode to be connected to exterior circuitry and the third portion provides an electrical lead between the first and second film portions. The cells may be tubular or thimble shaped. Manufacture of the electrodes on the tubular cells is by dipping their ends into a metal compound solution and then treating the ends to plate the metal out of the solution. Apparatus employing this method utilises a turntable to carry the tubes and which is indexed between stations at which the different stages in electrode formation are carried out.

12 Claims, 7 Drawing Figures

CONDUCTIVITY MEASURING SYSTEM AND CONDUCTIVITY CELLS THEREFOR

This invention relates to electrodes for measuring cells and to apparatus and a method for manufacturing them.

In accordance with one aspect of this invention an electrical measuring cell comprises a container having an insulating wall providing a backing for two spaced electrodes each formed by a conductive film having three contiguous portions which respectively lie against the container inside wall face, the container outside wall face and a rim of the container adjoining the inside and outside wall faces, the electrode portion inside the container being co-extensive with the adjoining wall surfaces.

The cell may take the form of a straight-narrow bore tube provided at each end portion with similar electrodes. Preferably the tube is made of transparent glass and conveniently the electrode portions inside the tube extend nearer one another than the electrode portions outside the tube. The inner tube portions are then visible through the wall of the tube and any air bubbles formed in a liquid held in the container between the two electrodes will be visible. A suitable material for the electrode is a metal such as gold although it is not essential to use a metal for the electrode.

Other forms of container may be used to form the cell. For example, the container may be constructed as a thimble of insulative material, such as glass, closed by a removable cap and providing a well which contains respective portions of the two electrodes. Once again the electrodes may be made of gold and the thinness of the electrode portion within the well is preferably such that it is effectively continuous with the unplated adjacent portions of the wall of the container so that there is no noticeable step between them.

Preferably the portion of the electrode formed on the rim of the container and also an adjoining part of the electrode portion on the outside wall of the container are covered with a hard layer of insulating material to protect these electrode portions from damage. The hard layer may take the form of a hardened epoxy resin.

The cell is particularly well adapted for use with the measuring apparatus described in my article in the periodical NATURE, Volume 226 April 18th 1970 at page 269 hereby inserted by way of reference. The apparatus disclosed in the article is an alternating current bridge measuring network having two similar cells disposed in respective arms of the bridge and in one of which is an inhibiting agent which delays or prevents an effect occurring in the liquid in one of the cells as compared with the other cell. In this way the influence of the effect on the electrical impedance of the liquid in one of the cells can be studied alone without being affected by other influences which are occurring simultaneously in the liquid of both cells.

Conveniently the cells are packaged in pairs each package containing two electrically matched cells as set forth in the broad aspect of the invention, one of the cells containing a substance which is absent from the other cell and provides the inhibiting agent, the two cells being distinguished from one another by appropriate marking. Suitably when the cells are in the form of straight tubes the inhibiting agent is coated on the inside wall of the tube between the electrodes. A suitable substance for delaying or inhibiting blood coagulation is silicone or heparin. If the containers are constructed as glass thimbles closed by caps and containing a non-gaseous medium, markings on their caps may be used to distinguish the cell containing the inhibiting agent from the other cell.

In accordance with a third aspect of the invention there is provided a method of making a cell including the steps of immersing one end-portion of an upright insulating tube in a wetting solution of a metal compound, drying the wetting solution to deposit a dry and firm metal-containing layer on the end-portion of the tube, inverting the tube, and forming a dry conductive metal-containing layer on the other end-portion of the tube in the same way. Following the formation of the electrodes they may have their exposed parts on the end rims of the tube and the adjoining exposed margins of the outer electrode portions coated with an insulating resin which is then hardened to provide a protecting layer.

The invention also includes apparatus for making a cell in the form of a straight tube having an electrode at each end, such apparatus comprising a holder for retaining at equi-spaced positions upright glass tubes, a drive for cyclically indexing the glass tube positions past a number of stations which include a tube-loading or first station, an immersion or second station where one end portion of a tube is immersed in a wetting liquid containing a dissolved metal compound, a drying or third station where the drying of the liquid on the tube end-portion takes place to leave a metal-containing deposit on the tube end-portion, an inverting or fourth station where the held glass tubes are inverted prior to recycling them past the stations, and an unloading or fifth station at which the tubes are removed from the holder.

Preferably the apparatus has the holder in the form of a turntable which is indexed between the stations to carry out the various stages necessary in the production of the cell.

The invention will now be described in more detail, by way of example, with reference to the accompanying drawings, in which.

Figure 1:
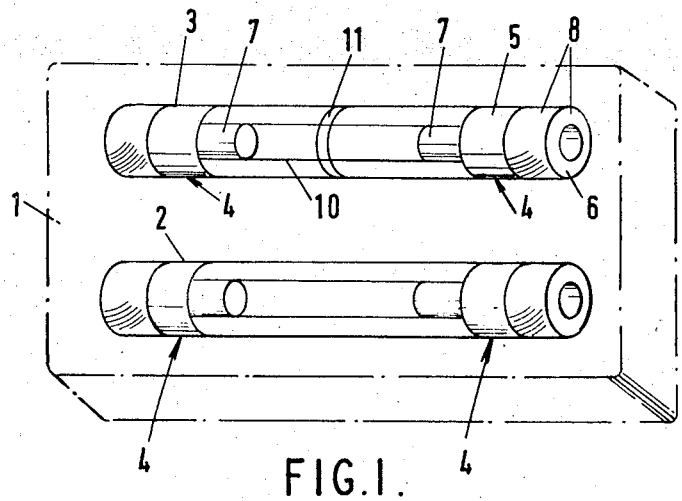
FIG. 1 shows in perspective a package containing two electrical measuring cells.

Referring to FIG. 1 a transparent sealed package 1 contains a pair of cells 2 and 3 each of which comprises a glass tube 3 centimetres long and having an external diameter of four millimetres and an internal diameter of 1½ millimetres.

At each end the respective tubes are provided with an electrode 4 formed as a metal plating on the tube and bonded intimately to its surface. Each electrode 4 has an outer portion 5 which is plated on the cylindrical outer wall of the tube, an intermediate portion 6 which is plated on the end rim of the tube and an inner portion 7 which is plated on the inside wall of the tube and projects inwardly beyond the inner end of the outer electrode portion 5. The axial length of the tube bore between the inner electrode portions 7 is 1 centimetre. A layer of hardened resin 8 covers the electrode portion on the end rim of the tube and also the adjoining part of the exposed electrode portion 5.

The two electrodes are matched to one another so that they hold the same volumes of liquid and have the same electrically properties. One of the cells which is to provide a reference cell has its bore coated with a thin film 10 of heparin which is not present in the other cell. To distinguish this cell it is provided with a marking 11 coloured red on the tube wall.

The above described pair of cells may be used to investigate the changes in the electrical impedance of blood during coagulation as is described in detail in my article appearing in Nature, Volume 226 April 18, 1970 at page 269.

Figure 2:
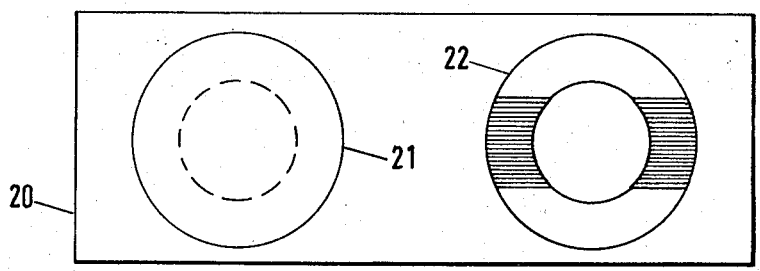
FIG. 2 is a plan view of another package containing two electrical measuring cells of different type, one of the cells having its cap removed.
Figure 3:
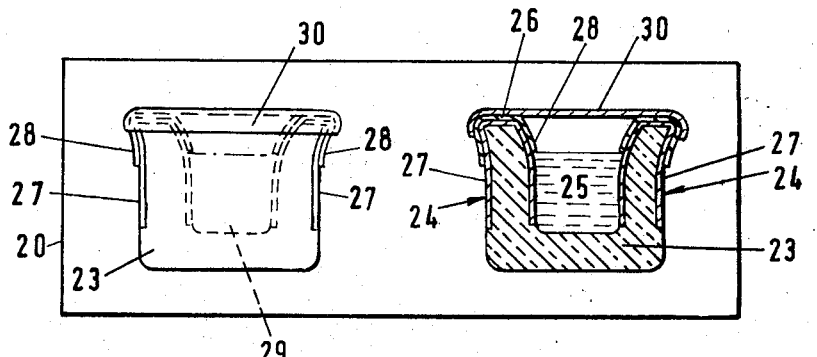
FIG. 3 is a side view of the package shown in FIG. 2 and with one of the cells shown in section.

The cells shown in FIGS. 2 and 3 are constructed differently from these shown in FIG. 1 and are used for investigating different phenomenon. In FIGS. 2 and 3 a package 20 contains two cells 21, 22 which are identically constructed. Each cell comprises a glass thimble 23 provided at diametrically opposite positions with electrodes 24 formed by discrete metallised areas on the surface of the thimble wall. Each electrode 24 has an interior portion 25 which plates the inside wall of the thimble, an intermediate portion 26 which extends around the rim of the thimble to an outer portion 27 which extends down the outside wall of the thimble. The intermediate electrode portion 26 together with the adjoining parts of the inner and outer electrode portions are protected from scratching or other damage by means of a layer 28 of hardened resin. Each thimble provides a well and is closed by a detachable cap 30 which may be stripped from the mouth of the well when the cell is to be used. One of the cells contains a reaction inhibiting agent and to distinguish it from the other cell of the pair which is in all other respects identical, its cap is marked with a R to denote that when used in a bridge network as is described in the above-mentioned Article in Nature, it is to be the reference cell as opposed to the measuring cell. Both cells contain a gel medium 29.

In both of the pairs of cells the electrode is formed by a metal plating of gold which is intimately keyed to the surface of the glass on which it is deposited so that there is no intervening step and the surfaces of the electrode and the glass appear continuous. This is particularly important not only from the point of view of cleaning the cell but also because when investigating the coagulation of blood the phenomenon taking place during coagulation appear to occur first at the wall of the cell and to be influenced by the cleanliness of the cell wall. Indeed, if the cells of FIG. 1 are not accurately matched and if the bores of the tubes are not completely clean, the experimental results can be impaired. As an example of the state of cleanliness required, the cleaning of the cells with soap as opposed to detergent may result in a less satisfactory experimental curve being obtained when using the technique disclosed in the said article in Nature.

Figure 7:
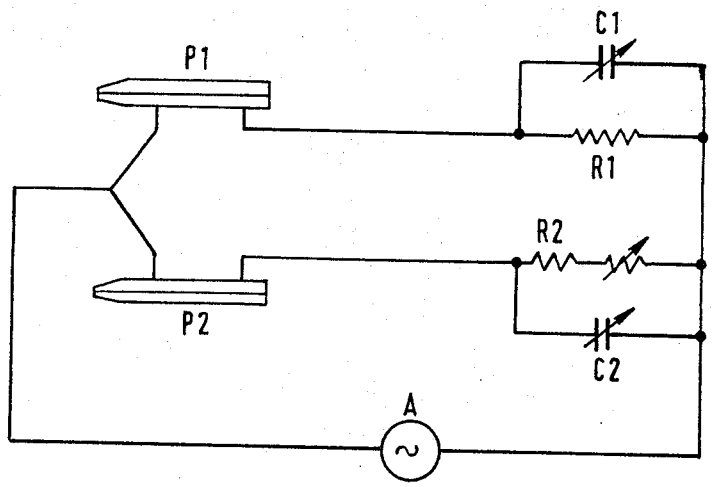
FIG. 7 shows a bridge measuring circuit as is described in the article in NATURE referred to above.

The advantage of the cell shown in FIGS. 2 and 3 is that they may be sold filled with identical quantities of the same medium 29 as a matched pair for use with apparatus as mentioned in the said Nature article of which FIG. 2 corresponds to FIG. 7 herein.

The cell shown in FIG. 1 may be made by means of the apparatus shown in FIGS. 4 and 5 and which will now be described in detail together with the method of cell manufacture.

Figure 4:
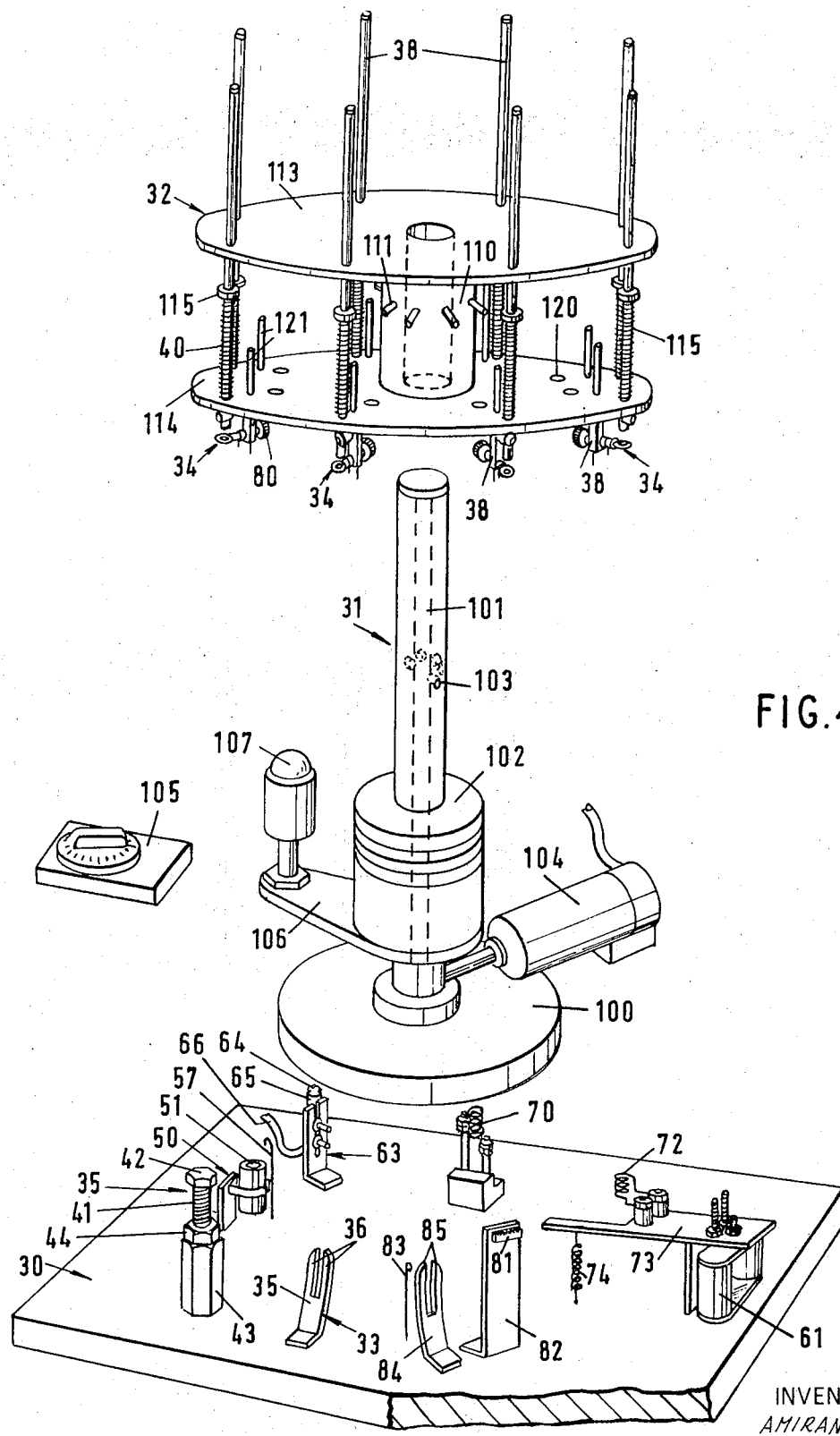
FIG. 4 is an exploded perspective view of apparatus for making the cells of FIG. 1.

Referring to FIG. 4 the apparatus comprises a base 30, a centre support pillar 31, an indexing turntable 32 and an actuator housing 39. Each of these will now be described.

Figure 6:
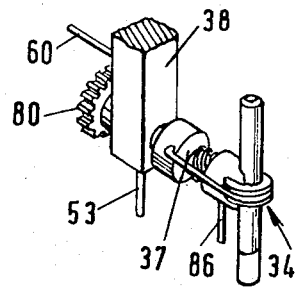
FIG. 6 shows a detail of FIG. 4 to an enlarged scale.

The base is provided with eight equi-angularly spaced stations. The first station 33 is a loading station where sections of glass tube are inserted into clamps 34 carried on the underside of the turntable 32. At the loading station there is an upwardly curved fork 35 having two tines 36 which, see FIG. 6 respectively engage behind a disc 37 provided on the clamp 34 to ease the clamp radially outwards from the turntable thereby opening it as it is pressed downwardly by a supporting push rod 38. When a tube section is inserted into the clamp the push rod 38 is released so that a spring 40 restores it to its raised position while simultaneously closing the clamp 34 to hold the tube section in place with its axis vertical.

The second station 41 comprises a tube-height adjustment station. A bolt 42 is screwed into a socket 43 and is provided with a lock nut 44 enabling the height of the head of the bolt to be finally controlled and set in position. A tube section carried by the turntable from the loading position to the adjustment position is gently lowered by de-pressing the push rod 38 a predetermined amount. This causes the lower end of the held tube section to abut the top of the bolt 42 and as the clamp allows the tube section to slide within it, the height of the lower end of the tube section on leaving the second station is at a predetermined level. To adjust this level the bolt is rotated. The depression of the push rod 38 is carried out manually in the apparatus illustrated although it will be appreciated that automatic means such as a cam may be used if the apparatus is fully automated.

The third station 50 above which the clamped tube section next locates at the next indexed position of the turntable 32, comprises a well 51 filled to the brim with a solution of a gold compound. An electric lead 52 extends from the well (FIG. 5) and completes an electrical circuit to control the depth of immersion of the end portion of the glass tube. This depth is controlled by a whisker electrode 53 carried on a non-rotatable part of the clamp 34. At the third station 50 the depression of the push rod 38 is carried out by an electrically driven actuator 54 when a timer 55 comes to the end of a triggered timing period. The signal from the timer is passed through a depth control unit 56 associated with the actuator 54 and which de-energises the actuator when the electrical circuit between the whisker electrode 53 on the clamp and the gold solution is completed during lowering of the push rod 38 by the signal from the timer 55.

An electrode in the form of an inverted J and formed by a springy wire 57 is also located at the third station. The purpose of the electrode is to make contact with a probe electrode 60 carried by the non-rotatable part of the clamp during terminal movement of the clamp to the third station. Completion of the electrical circuit between the electrodes 57 and 60 triggers the timer 55 and also energises a solenoid 61. The probe electrode 60 presses against the shorter arm of the inverted J so that at the end of the period set by the timer, the depression of the push rod 38 causes the probe electrode 60 to descend beneath the lower end of the shorter limb of the electrode 57 which, under its own resilience, returns to its previous position so that after breaking of the circuit between the two electrodes it is not again restored when the push rod 38 returns to its raised position under the influence of the spring 40.

The fourth position 63 with which the turntable registers is a wiping station. Here a soft wick 64 protruding from the upper end of a tube 65 connected by a pipe 66 to a source of suction (not shown), wipes gently against the lower end of the tube section so that surplus gold solution is removed.

The fifth station above which the tube section locates is a drying station formed by an electrically heated coil 70 which removes the solvent from the tube section.

The sixth station is a cooling station where warm air is blown gently through the interior of the held tube section.

The seventh station is a baking station which is formed by an electrical heating coil 72 carried at one end of an armiture 73 which is arranged as a first order lever and is positionally controlled by the solenoid 61. A spring 74 holds the coil 72 in its lower position at which held tube sections can pass freely above it. When a tube section is located above the coil 72 another tube section is simultaneously brought above the third station and the circuit between the electrodes 60 and 57 is completed to energise the solenoid 61 causing the coil 72 to be lifted up around the dry coating on the lower end of the held tube section. Simultaneously energisation of the coil 72 takes place and the gold coating is baked for approximately one or two minutes so that it keyes itself intimately with the surface of the glass tube section. At the end of the one or two minute period, the timer 55 operates to depress the push rod 38 at the third station so that the circuit between the electrodes 57 and 60 is broken. This de-energises the solenoid 61 and allows the spring 74 to lower the coil 72 thus enabling the held tube section to be moved to the eight position on the base.

During this movement, a pinion 80 carried by the clamp and which controls its rotation passes over a rack 81 held by a bracket 82 to the base and the length of the rack 81 is such that the pinion is rotated through 180°.

The clamp finally registers above the unloading station at which there is located a flag electrode 83 and a second fork 84 having two tines 85 which engage behind the disc 37 of the clamp as the clamp is lowered, to open the clamp 34 and allow the held tube section to drop out. However, unloading of the tube section only occurs if a circuit is completed between the flag electrode 83 and a pin electrode 86 carried on the rotatable part of the clamp. This pin electrode 86 is so arranged that it intercepts the top of the flag electrode 83 when in the position shown in the detail view of the clamp in FIG. 6. This, in fact, is the loading position of the clamp and, as a result of the rack 81, the pin electrode 86 is upwardly pointing when the tube section reaches the unloading station for the first time. The circuit with the flag electrode 83 is not therefore completed and the inverted tube section is carried around each of the stations again so that a second gold coat is formed on its other end. After formation of the second gold coat the pin electrode 86 is brought to its downwardly directed position by the rack 81 and thus, at the unloading station, its contact with the flag electrode 83 completes a circuit to an unloading actuator 88 which depresses the push rod 38 so that the unloading fork 84 opens the clamp 34 and releases the cell.

The pillar 31 which supports the turntable during its rotation is provided with a base flange 100 which is bolted to the base 30 and a vertical pipe 101 which carries a support bush 102 and is provided with five lateral openings 103 opening into the interior of the pipe 101. A lower opening in the pipe is connected to a hot air blower 104 mounted on the base 30 and providing warm air at a temperature controlled by a multiposition switch 105 also fixed to the base.

A lateral arm 106 extends away from the underside of the bush 102 and carries at its upper end a spring loaded ball 107 which positively locates the turntable 32 in each of the positions in which it is indexed by engaging in turntable holes 120.

The turntable 32 rests on the bush 102 and has a centre collar 110 provided with a ring of eight nozzles 111. Each of these nozzles is connected by a length of rubber tubing 112 to one of the push rods 38 which are hollow and are likewise provided with lateral nozzles (not shown). The push rods 38 pass through registering holes in radial flanges 113 of the turntable 32, and are held in their raised positions by the springs 40 which engage at their lower ends on the upper surface of the lower flange 113, and at their upper ends on collars 115 provided on respective push rods. The lower ends of the push rods are open so that at selected indexed positions of the turntable 32 the warm air from the centre pillar 31 can travel by way of the nozzles 111, the tubing 112 and the push rods 38 to their lower ends which discharge the air downwardly around and through the tube sections held in the clamps 34. This warm air is only discharged when the tube section is at any of the fourth to eighth stations inclusive.

The lower flange 113 of the turntable is provided with a ring of eight holes 120 which are partially entered by the ball 107 to positively locate the turntable 32 in each of the eight positions corresponding to the different stations on the base 30.

The lower end portion of each of the push rods 38 is attached beneath the lower flange 113 to the clamp assembly 34 from which a slide rod 121 projects upwardly through a second opening in the lower flange 113.

Figure 5:
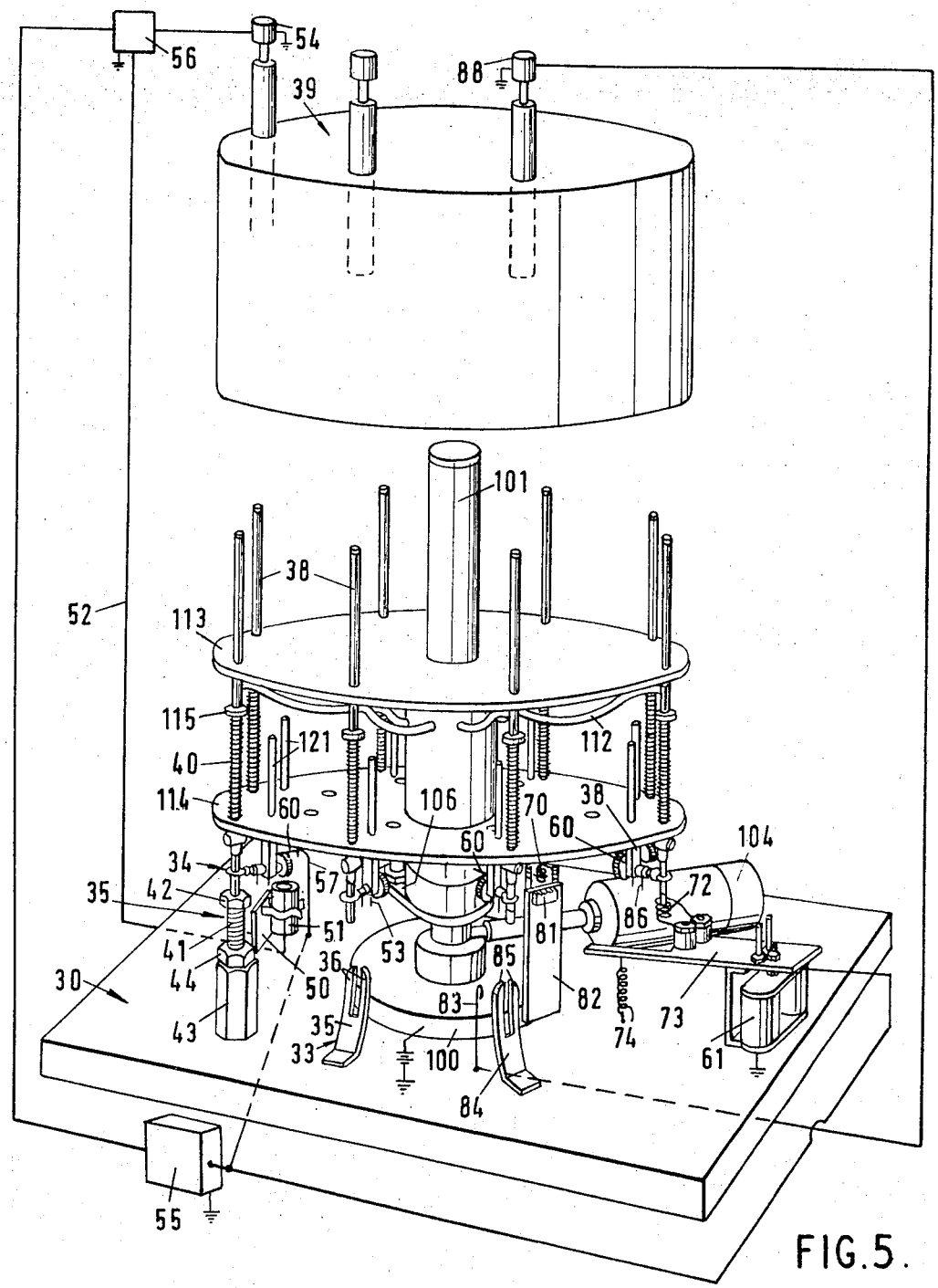
FIG. 5 shows the assembled apparatus with two cells in position.

The apparatus shown in FIGS. 4 and 5 is used to manufacture cells as follows:

At the loading station 33 the presence of an empty clamp is detected as it corresponds to an unloading operation being carried out at the previous unloading station. A suitable register operated by the circuit to the actuator 88 may be used to provide this information. The push rod 38 associated with the clamp at the loading station may be depressed either manually or by an automatic pusher so that the clamp 34 is opened and then a cell 9 loaded into it. As the push rod 38 lifts, the clamp closes on approximately the centre of the glass tube section which is thereafter held with its bore in alignment with the lower open end of the push rod 38.

The turntable is indexed around either manually or automatically by a suitable indexing drive applied to its rim, and the held tube is brought first to the levelling station.

At the levelling station the push rod 38 is depressed so that the lower end of the upright tube section held in the clamp 34 is brought down against the head of the bolt 42. Further lowering of the push rod 38 to a chosen position merely causes the clamp 34 to slide down the tube section. The push rod 38 is then released and returns to its former position under the action of the spring 40. The extent to which the tube section extends beneath the clamp 34 is thus fixed.

The turntable is then rotated to the next indexed position to bring the tube section to the third station at which immersion, by dipping, of the lower end-portion of the tube section in the gold solution takes place. Initially, when the tube section reaches the third station it is held above the reservoir of gold solution in the well 51 for a time determined by the timer 55. Its supporting push rod 38 is then pushed down by the actuator 54 for a distance determined by the depth control unit 56 to immerse the lower end portion of the tube section in the gold solution. In this way the outside and interior surfaces of the tube section are coated with the gold solution which advanced 2 or 3 millimetres upwardly inside the tube section farther than on the outside as a result of the capillary action of the tube section bore. The depth of immersion is controlled by the pin electrode 86 touching the surface of the gold solution. When this occurs the drive circuit to the actuator 54 is broken and the spring 40 raises the push rod 38 to its upper position. When this has occurred the turntable is advanced to its next indexed position at which the surplus solution is removed from the lower end of the tube section by the wick 64 at the wiping station 63.

The next step of the turntable brings the lower end portion of the tube section above the energised drying coil 70 which dries the outside of the lower end-portion of the tube section while simultaneously warm air from the blower 104 is discharged downwards through the lower end of the push rod 38. This warm air passes through the bore of the tube section so that drying takes place without boiling of the gold solution inside the tube and subsequent upward migration inside the tube bore.

The tube section then advances to the next position at which warm air from the push rod 38 is again discharged through its interior and around its outside to stablise its temperature.

The next step of the turntable brings the tube section above the coil 72. Simultaneously the electrodes 60 and 57 at the immersion or third station contact one another to energise the solenoid 61 and the timer 55. The energisation of the solenoid 61 is simultaneously accompanied by energisation of the heating coil 72 which is lifted around the lower end of the tube section to bake the dried gold compound deposited on it. This produces simultaneously a plating out of metallic gold in the compound onto the surface of the glass of the tube and an intimate bonding of the gold and glass to one another so that a gold film of perhaps a few microns thick is formed on the inside, outside and end rim of the lower end portion of the tube. At the end of the time interval to which the timer 55 is set, the actuator 54 is operated to dip the glass tube located at the dipping station into the gold solution reservoir until the unit 56 is operated. The lowering of the push rod 38 simultaneously interrupts the electrical circuit between the electrodes 60 and 57 to de-energise the solenoid 61 allowing the coil 70 at the baking station to drop back to a level beneath the lower end of the held tube located above it.

The turntable is then rotated to the next position to run the pinion 80 along the rack 81 so that the tube section is reversed end-for-end and brought to the unloading station 84. The reversal of the tube end-for-end prevents the pin electrode 86 from contacting the flag electrode 83 at the unloading station so that unloading does not take place as the actuator 88 is not operated.

The absence of an unloading operation is detected by the register (not shown) so that at the next step of the turntable 32 a new loading operation, if conducted automatically, does not take place. Thus the inverted tube section once again travels around the different stations so that a gold electrode is formed on its lower end in identical manner to that already described.

Eventually the tube section is again reversed by the rack 81 between the seventh and eighth stations so that the pin electrode 86 extends downwardly at the unloading station and contacts the flag electrode 83. This operates the unloading actuator 88 causing the push rod 38 to descend so that the disc 37 of the clamp 34 is engaged by the tines 85 of the fork 84 and open the clamp 34 and allow the finished tube section complete with gold electrodes at both ends to drop out and be collected.

The above described apparatus can be modified to increase the rate of production. For example, more stations can be provided to reduce the dwell time of the turntable at each station which, of course, is controlled by the timer 55. Also, the baking of the dry gold compound on the ends of the tube section may be carried out simultaneously at both ends of the tube section after the tube sections have been unloaded from the apparatus.

Finally the cells made by the apparatus are collected and are heated in a oven at about 650°C for 2 or 3 hours to consolidate the electrodes. The cells are then cleaned with detergent and are ready for packing and use.

The term "inhibiting" is used to mean positive inhibiting, i.e., delaying, negative inhibiting, i.e., accelerating, or in the sense of activating.

I claim:

1. In an electrical measuring system,
   a. at least two physically and electrically matched conductivity cells,
   b. each of said conductivity cells including:
      1. a container made of a substantially transparent, non-conductive material having, an inner wall, an outer wall, and at least one end wall defining a rim connecting said inner wall to said outer wall.
      2. two spaced electrically conductive films deposited on surface areas of the walls of said container,
      3. each of said spaced electrically conductive films having, an inner section continuous with a portion of the inner wall, a rim section continuous with a portion of the rim, and an outer section continuous with a portion of the outer wall electrically joined to each other,
      4. said inner section on each pair of spaced electrically conductive films and said inner wall defining a conductivity chamber in the cell of predetermined dimensions therebetween.

c. spaced interrelated circuits in said electrical measuring systems each respectively having means for connecting at least one of said conductivity cells therein, d. and means making at least one of said conductivity cells a reference against which the impedance changes in the other cells can be measured.

2. In an electrical measuring system as claimed in claim 1 wherein the means making at least one of said conductivity cells a reference for measuring impedance changes in the other cell includes, a. a reactive substance operatively associated with the conductivity chamber of the reference cell, b. and means marking the reference cell for identifying the same.

3. In an electrical system as claimed in claim 1, wherein the reactive substance in the conductivity chamber of the reference cell is from the group, heparin and silicone.

4. In an electrical system as claimed in claim 1 in which each rim section and a portion of the outer section of the electrically conductive film on each of the cells is covered by a hard insulating material.

5. In an electrical system as claimed in claim 4 wherein the means making at least one of said conductivity cells a reference for measuring impedance changes in the other cells includes, a. a layer of inhibiting material on the inner wall of the reference cell, b. and means marking the reference cell to identify the same.

6. In an electrical system as claimed in claim 5 wherein the layer of inhibiting material on the inner wall of the reference cell is from the group, heparin and silicone.

7. The combination for use in an electrical measuring system as claimed in claim 1 of a cassette holder for at least two conductivity cells.

8. An electrical measuring cell for use in an electrical measuring system comprising, a. capillary type tubular means made of a substantially transparent insulating material having an inner wall and an outer wall and end portions defining rims at opposite ends of the tubular member connected to the inner wall and the outer wall, b. two spaced electrically conductive films deposited on surface areas of the tubular means having sections electrically joined to each other including, 1. an inner section continuous with a portion of the inner wall, 2. a rim section continuous with a portion of the rim, 3. and an outer section continuous with a portion of the outer wall.

c. each of said spaced electrically conductive films having their respective inner sections substantially precisely spaced from each other so as to delineate with the inner wall of the capillary type tubular means a conductivity chamber in the measuring cell having predetermined dimensions, and d. the respective inner sections of the spaced electrically conductive films on the inner wall being closer to each other than the outer sections of the spaced electrically conductive films extending along the outer wall.

9. In an electrical measuring cell as claimed in claim 8, including, a layer of hard insulating material covering the rim section and at least a portion of the outer section of the electrically conductive film.

10. In an electrical measuring cell as claimed in claim 8 including, a. a reactive substance operatively associated with the conductivity chamber formed in the capillary type tubular means, and b. means marking the outer wall of the tubular means.

11. In an electrical measuring cell as claimed in claim 10 wherein the reactive substance is from the group heparin and silicone.

12. In combination, at least two electrical measuring cells for use in a system for determining the relative impedance changes in at least one of the measuring cells, each of said conductivity cells including:

a. capillary type tubular means made of a substantially transparent insulating material having an inner wall and an outer wall and end portions defining rims at opposite ends of the tubular member connected to the inner wall and the outer wall, b. two spaced electrically conductive films deposited on surface areas of the tubular means having sections electrically joined to each other including, 1. an inner section continuous with a portion of the inner wall, 2. a rim section continuous with a portion of the rim, 3. and an outer section continuous with a portion of the outer wall.

c. and each of the spaced electrically conductive films on each of said electrical measuring cells having their respective inner sections substantially precisely spaced from each other so as to delineate with the respective inner wall in each cell a conductivity chamber having predetermined parameters, d. the respective inner sections of the spaced electrically conductive films on the inner wall being closer to each other than the outer sections of the spaced electrically conductive films extending along the outer wall, e. and means making at least one of said conductivity cells a reference against which the impedance changes in the other cell can be measured.

* * * * *